US012559356B2

(12) United States Patent
Kaack

(10) Patent No.: US 12,559,356 B2
(45) Date of Patent: Feb. 24, 2026

(54) BEVERAGE TAPPING COLUMN WITH REMOVABLE TAP AND SHELL

(71) Applicant: MICRO MATIC A/S, Odense SV (DK)

(72) Inventor: Klaus Kaack, Odense N (DK)

(73) Assignee: MICRO MATIC A/S, Odense SV (DK)

( * ) Notice: Subject to any disclaimer, the term of this patent is extended or adjusted under 35 U.S.C. 154(b) by 160 days.

(21) Appl. No.: 18/702,200

(22) PCT Filed: Oct. 18, 2022

(86) PCT No.: PCT/EP2022/078923
§ 371 (c)(1),
(2) Date: Apr. 17, 2024

(87) PCT Pub. No.: WO2023/066905
PCT Pub. Date: Apr. 27, 2023

(65) Prior Publication Data

US 2024/0417235 A1 Dec. 19, 2024

(30) Foreign Application Priority Data

Oct. 21, 2021 (DK) ........................... PA 2021 70518
Oct. 22, 2021 (DK) ........................... PA 2021 70519
Oct. 22, 2021 (DK) ........................... PA 2021 70520

(51) Int. Cl.
*B67D 1/06* (2006.01)
*B67D 1/08* (2006.01)
*B67D 1/14* (2006.01)

(52) U.S. Cl.
CPC ............ *B67D 1/06* (2013.01); *B67D 1/0867* (2013.01); *B67D 1/0877* (2013.01); *B67D 1/1405* (2013.01); *B67D 2210/00044* (2013.01)

(58) Field of Classification Search
CPC ........ B67D 2210/00044; B67D 1/1405; B67D 1/0877; B67D 1/0867; B67D 1/06
See application file for complete search history.

(56) References Cited

U.S. PATENT DOCUMENTS 3,752,192 A * 8/1973 Kleppin .................. F16K 27/12 222/113
5,232,129 A 8/1993 Guerra
(Continued)

FOREIGN PATENT DOCUMENTS

EP 3 186 188 A1 7/2017
GB 2358854 A 8/2001
(Continued)

OTHER PUBLICATIONS

International Search Report dated Feb. 6, 2023 (6 pages) from PCT Priority Application PCT/EP2022/078923.
(Continued)

*Primary Examiner* — Paul R Durand
(74) *Attorney, Agent, or Firm* — Crowell & Moring LLP; Trevor K. Copeland

(57) ABSTRACT

A beverage delivery system including a dispensing column and a tap unit with a spout, wherein the tap unit is releasably connectable to the dispensing column. The dispensing column includes an elongated post and a removable elongated cladding component, the elongated cladding component receiving the elongated pos, wherein connecting the tap unit to the elongated post secures the cladding component to the elongated post and wherein disconnecting and removing the tap unit from the elongated post allows removal of the cladding component from the elongated post.

13 Claims, 7 Drawing Sheets

(56) References Cited

U.S. PATENT DOCUMENTS

| | | | | | |
|---|---|---|---|---|---|
| 5,884,813 | A | | 3/1999 | Bordonaro et al. | |
| 6,158,626 | A | * | 12/2000 | Guerra | B67D 1/0872 D7/397 |
| 6,502,724 | B1 | | 1/2003 | Kelpach | |
| 7,743,624 | B2 | * | 6/2010 | Schneller | B67D 1/0877 62/389 |
| 10,280,059 | B2 | * | 5/2019 | Peirsman | B67D 1/06 |
| 10,501,306 | B2 | | 12/2019 | Donabauer et al. | |
| 11,198,602 | B2 | * | 12/2021 | Dirx | B67D 1/0081 |
| 2004/0069368 | A1 | | 4/2004 | Klaauw et al. | |
| 2004/0226967 | A1 | * | 11/2004 | Van Der Klaauw | B67D 1/0082 222/146.6 |
| 2017/0233237 | A1 | | 8/2017 | Donabauer et al. | |

FOREIGN PATENT DOCUMENTS

| | | | |
|---|---|---|---|
| GB | 2551037 | A | 12/2017 |
| WO | WO 2007/108682 | A1 | 9/2007 |
| WO | WO 2016/032333 | A1 | 3/2016 |

OTHER PUBLICATIONS

Written Opinion of the International Searching dated Feb. 6, 2023 (9 pages) from PCT Priority Application PCT/EP2022/078923.

* cited by examiner

BEVERAGE TAPPING COLUMN WITH REMOVABLE TAP AND SHELL

This application is a national application based on Patent Cooperation Treaty Patent Application No. PCT/EP2022/078923, filed on Oct. 18, 2022, the entire contents of which are incorporated herein by reference.

This application claims under 35 U.S.C. § 119(a) the benefit of the filing dates of: 1) Danish Patent Application No. PA 2021 70518, filed on Oct. 21, 2021; 2) Danish Patent Application No. PA 2021 70519, filed on Oct. 22, 2021; and 3) Danish Patent Application No. PA 2021 70520, filed on Oct. 22, 2021, the entire contents of each of which are incorporated herein by reference.

BACKGROUND OF THE INVENTION

Field of the Invention

The present invention regards a beverage delivery system with a tap unit that is releasably connected to a dispensing column.

Description of Related Art

Replace the paragraph beginning at page 1, line 9 with the following paragraph:

In one embodiment the dispensing column includes an elongated post, which may be configured to be fixed to a bar counter, and a removable elongated first cladding component, the elongated post being received within the elongated first cladding component, preferably with a close fit, wherein when the tap unit is connected to the post is the first cladding component secured in position relative to the post and wherein disconnecting and removing the tap unit from the post allows removal of the first cladding component from the post.

As is well-known, a user-visible component of a beverage dispensing column is often provided with information about the beverage available for pouring.

SUMMARY OF THE INVENTION

The present invention allows for an easy changing of such information provided by a beverage dispensing column connected to a tap unit.

In one embodiment the dispensing column comprises an elongated post, which may be configured to be fixed to a bar counter, and a removable elongated first cladding component, the elongated post being received within the elongated first cladding component, preferably with a close fit, wherein when the tap unit is connected to the post is the first cladding component secured in position relative to the post and wherein disconnecting and removing the tap unit from the post allows removal of the first cladding component from the post.

A method for carrying out the aforementioned easy changing of information involves the steps of first releasing the tap unit from the post, then displacing the first cladding component along the length of the post fixed to the bar counter, and then positioning another first cladding component by displacing it along the length of the post fixed to the bar counter, until the post is received within said another first cladding component.

The present invention also allows for an easy cleaning of a tap unit of a beverage dispensing system.

The invention will be described below with reference to preferred embodiments.

DETAILED DESCRIPTION

Figure 1:
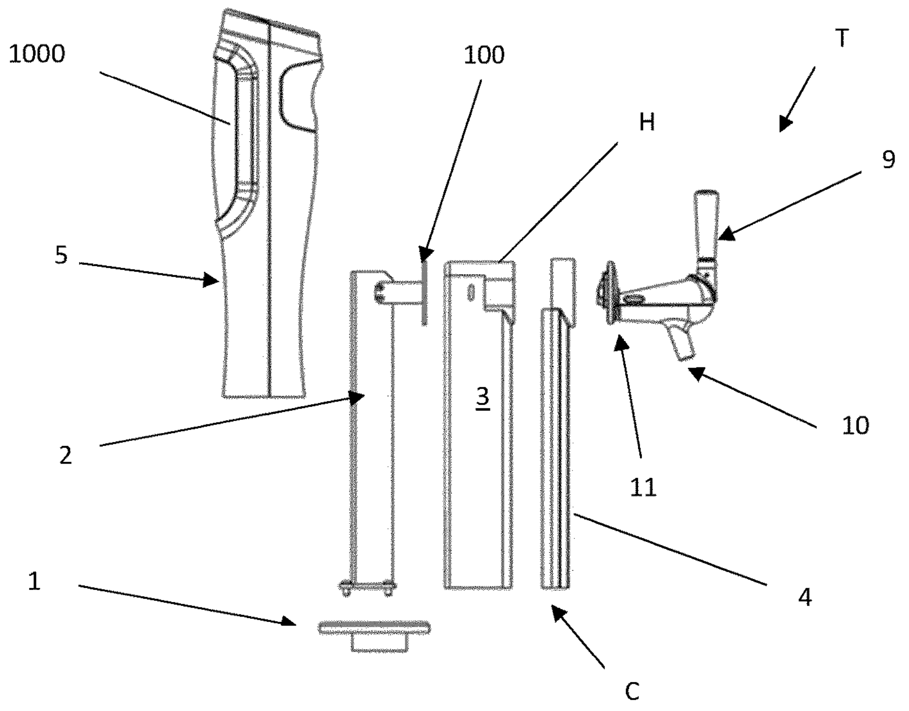
FIG. 1 is a side-by-side arrangement before assembly of various components of the beverage dispensing system of the invention.

FIG. 1 is a side-by-side view before assembly of various components of a dispensing column C for mounting onto a stand or a surface, such as a bar counter (not shown), that has a mounting fixture or base 1 to which the dispensing column C is to be fixed.

The dispensing column C is part of a beverage delivery system BDS including also a tap unit T with a spout 10 and with a connector flange 11 arranged opposite the spout 10. An embodiment of the beverage delivery system BDS is shown in FIG. 2*b*. The mounting fixture 1 may be clamped or screwed onto the aforementioned surface.

Inside the dispensing column C is arranged, or is arrangeable, a flexible tubing (not shown) for supplying a beverage, such as draft beer, from a keg (not shown) to the tap unit T, which tap unit T according to one aspect of the invention is releasably connected to a connector flange 100 of the dispensing column C by means of the connector flange 11 of the tap unit T.

Figure 2A:
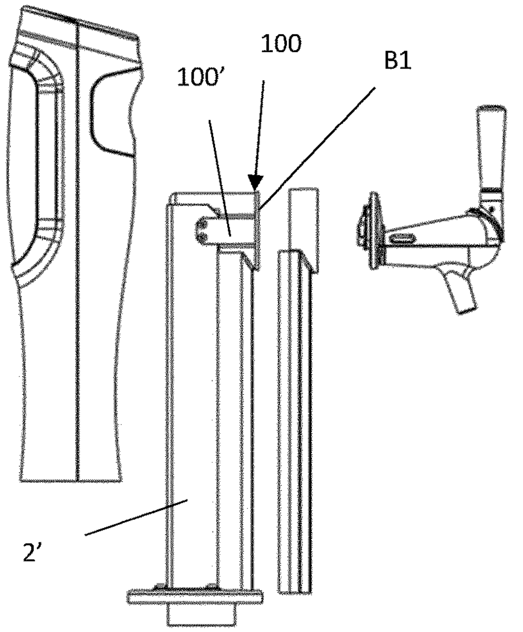
FIG. 2*a* is a similar side view, wherein some of the components of the beverage dispensing system have been assembled.
Figure 2B:
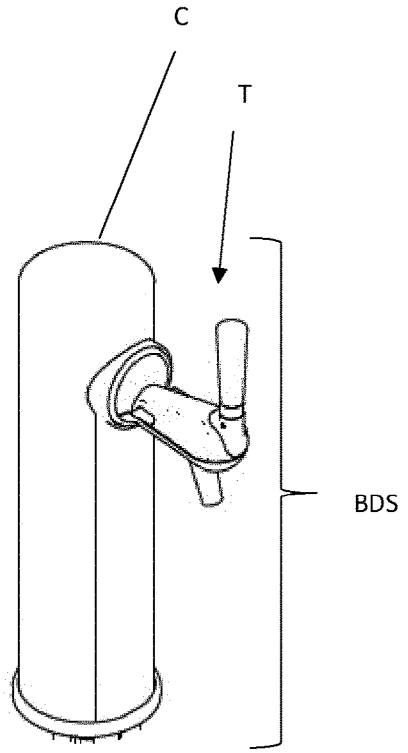
FIG. 2*b* is a perspective view of one embodiment of an assembled beverage delivery system of the invention.
Figure 2C:
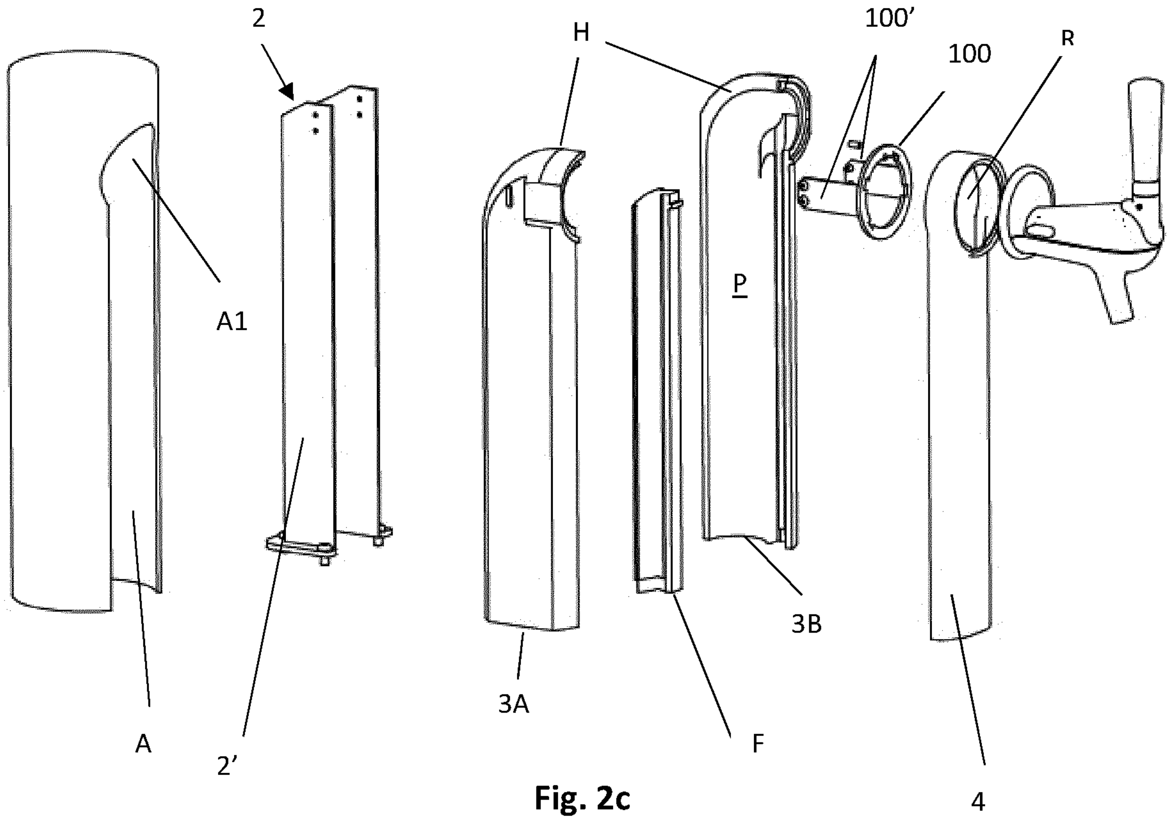
FIG. 2*c* is a perspective view showing the various components of another embodiment of the beverage dispensing system.

One component of the shown dispensing column C is a vertical metal post 2, preferably having a U-shaped cross-section, see FIG. 2*c*. The metal post 2 defines a rigid structural back-bone of the column C and is connected to the mounting fixture 1.

Inside the post 2 is an elongated structure 3, normally an elongated tubular structure 3, of a heat insulating material, preferably of a hardened foamed material, avoiding condensation. The elongated structure 3 has a head portion H at the level of the tap unit T and defines an internal passage P which at the head portion H opens up sideways. Cooling channels for a cooling fluid may be associated with the elongated structure 3, such as in a separate elongated front piece F, see FIG. 2*c*.

The elongated structure 3 preferably is formed from two half-shells 3A, 3B of the aforementioned heat insulating material, see FIG. 2*c* which also shows the separate front piece F as an item defining together with the two half-shells 3A, 3B the internal passage P.

The flexible tubing (not shown) extends inside the elongated structure 3, normally along the full length of the passage P, and has an end portion, optionally having a valve controllable by a dispensing handle 9 of the tap unit T. The end portion exits the elongated structure 3 where the passage P opens up at the head portion H and extends then further inside the tap unit T in fluid communication with the spout 10, once the tap unit T has been connected to the connector flange 100 of the column C.

Figure 4:
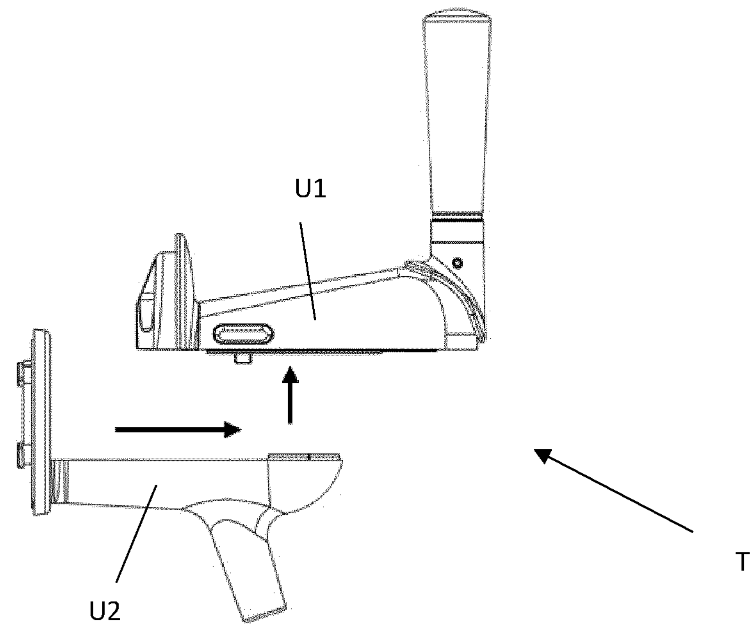
FIG. 4 is a side view of two components of the tap unit, showing how they may be manipulated for separation from one another.

Preferably, the tap unit T itself comprises two components, as shown in FIG. 4, that may be separated from one another to allow for insertion and correct positioning in the tap unit T of the end portion of the flexible tubing once the tap unit T has been connected to the connector flange 100 of the column C.

Thus, as shown, a first, upper component U1 of the tap unit T may have the dispensing handle 9 and associated mechanical parts for controlling the dispensing, while a second, lower component U2 of the tap unit T supports the end portion of the flexible tubing.

Figure 5A:
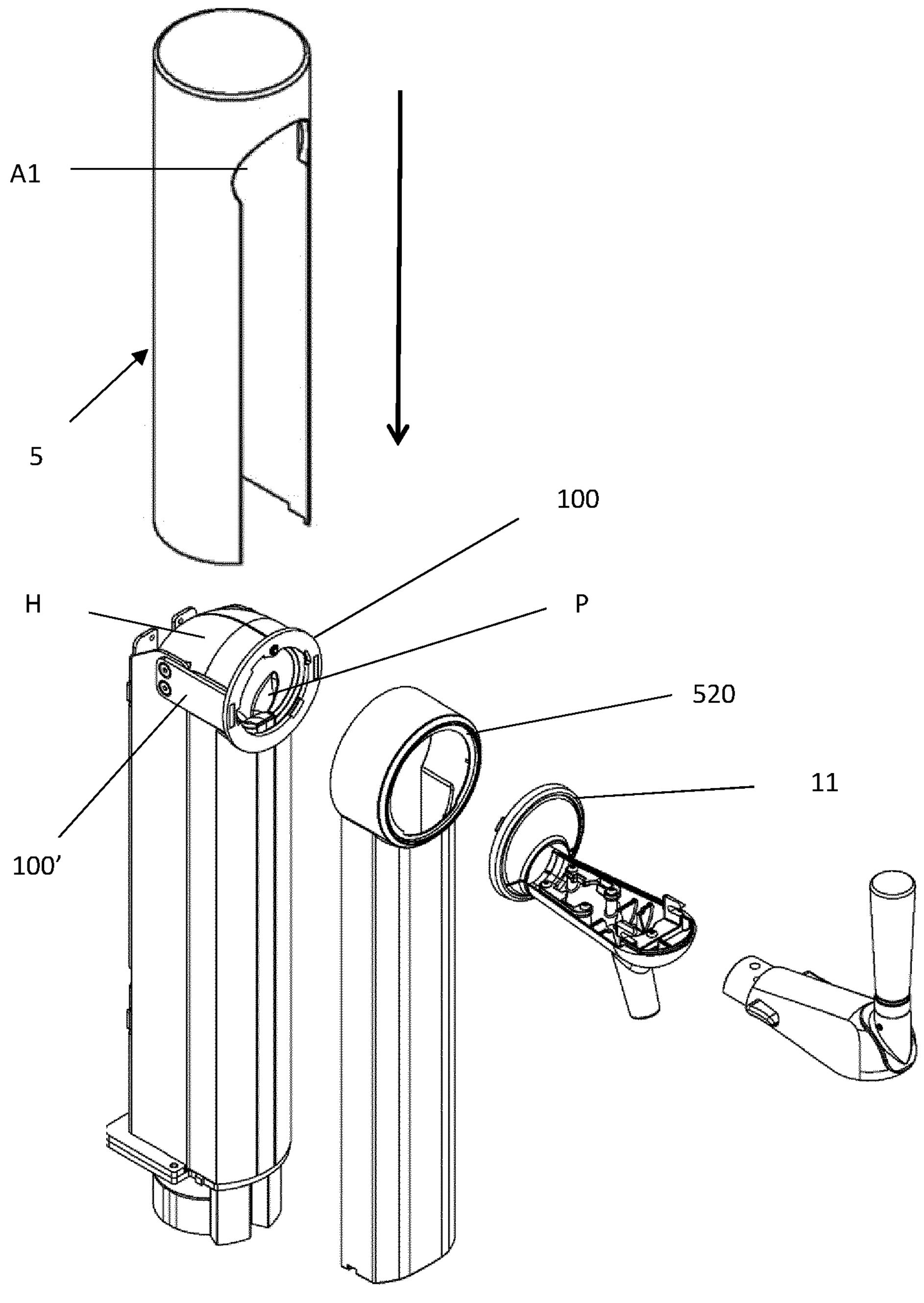
FIGS. 5*a*-5*d* are perspective views showing different steps during assembly of the embodiment of the beverage dispensing system shown in FIG. 2*b,*

As seen in FIGS. 2*c* and 5*a*, the connector flange 100 of the column C is ring-shaped and has opposite sides 100', each side 100' being connected to a respective side 2' of the post 2.

FIG. 2*a* shows the elongated structure 3 having been positioned between the two opposite sides 2' of the post 2 during assembly of the dispensing column C. The connector flange 100 of the column C remains accessible for connection with the connector flange 11 of the tap unit T.

The dispensing column C moreover comprises an elongated tubular or C-shaped first cladding component 5 with a downwardly open elongated keyhole shaped aperture A with a widened portion A1. The first cladding component 5 is preferably sized to narrowly receive the post 2 and the elongated insulating structure 3 therein.

On one side opposite the aperture A is the first cladding component 5 provided with indicia 1000, indicating by way of example the type of beverage dispensed by the beverage dispensing system BDS.

In a next step of the assembly of the dispensing column C is this first cladding component 5 lowered vertically, along the length of the post 2, in a way to receive therein the post 2 with the elongated heat insulating structure 3, see FIG. 5*a*.

Figure 2D:
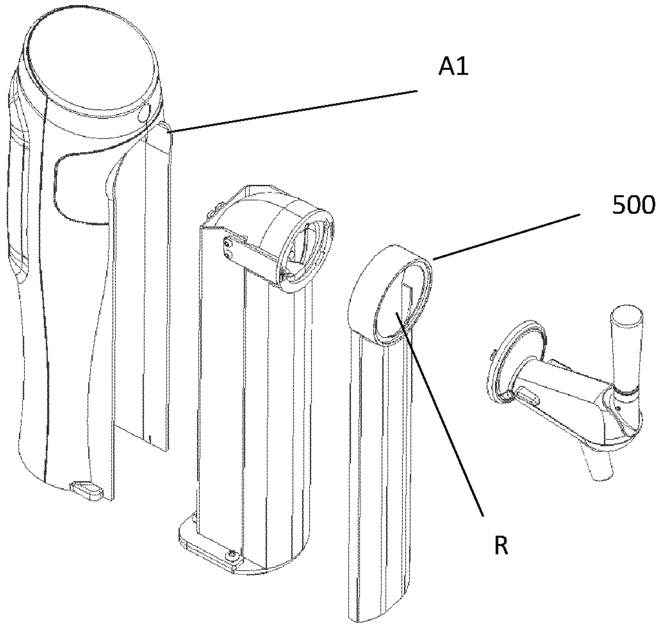
FIG. 2*d* is a perspective view of the partially assembled beverage dispensing system of FIG. 2*a,*

The first cladding component 5 defines at least the portion of the column C visible to a person standing in front of the bar, to which a drink is poured by another person standing in front of the spout 10. FIGS. 2*d* and 5*a* show different geometrical shapes of the first cladding component 5.

Figure 5B:
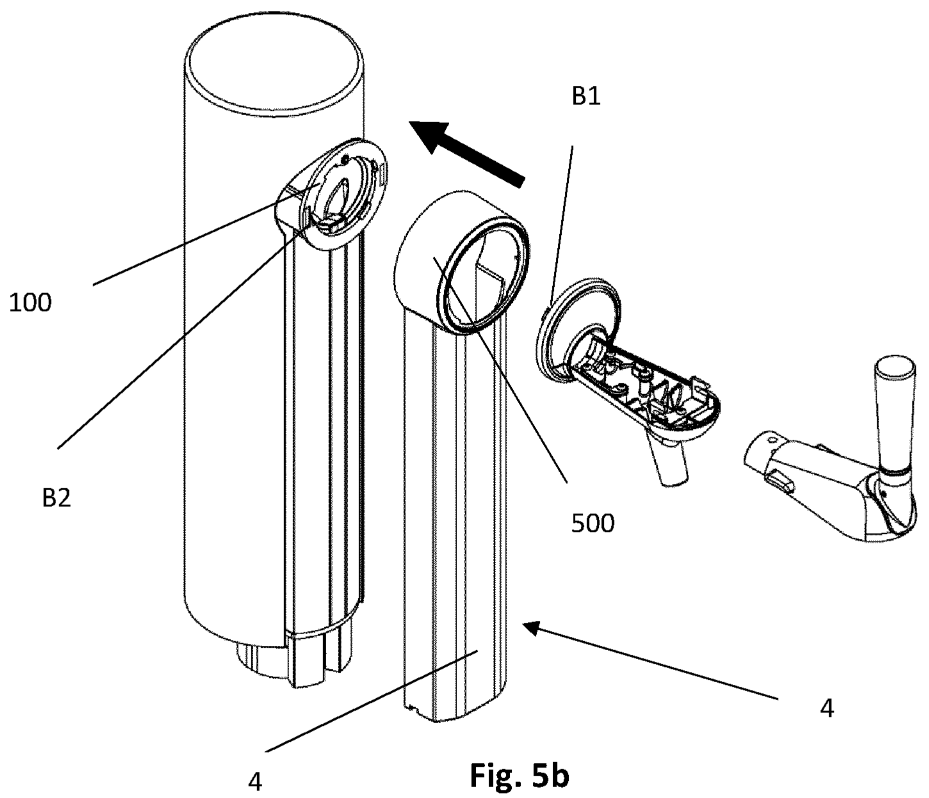
Figure 5C:
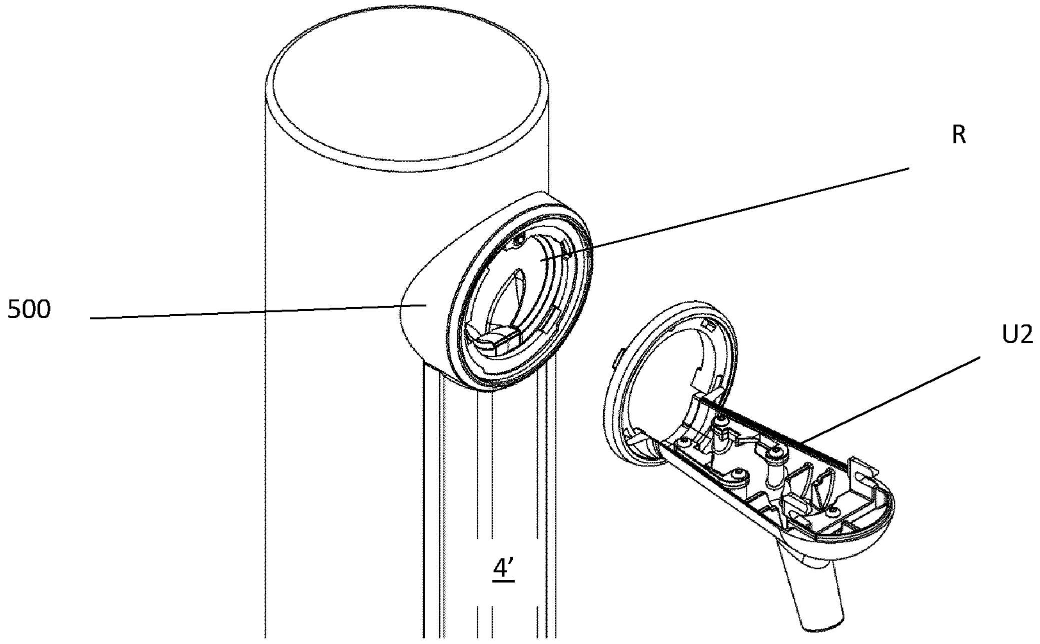

To complete assembly of the dispending column C is an elongated further, second cladding component 4 then shifted sideways, as shown by the arrow in FIG. 5*b*. The further, second cladding 4 has an enlarged top 500 with a through-going aperture R receiving the ring-shaped connector flange 100 of the dispensing column C. The widened portion A1 of the elongated aperture A of the elongated cladding component 5 on its side matingly receives the enlarged top 500 of the further, second cladding 4, as seen in FIG. 5*c*. The second cladding component 4 has a stem portion 4' configured for closing off the remaining portion of the elongated aperture A, such that the post 2 is completely surrounded by the first and second cladding components 4, 5.

Figure 5D:
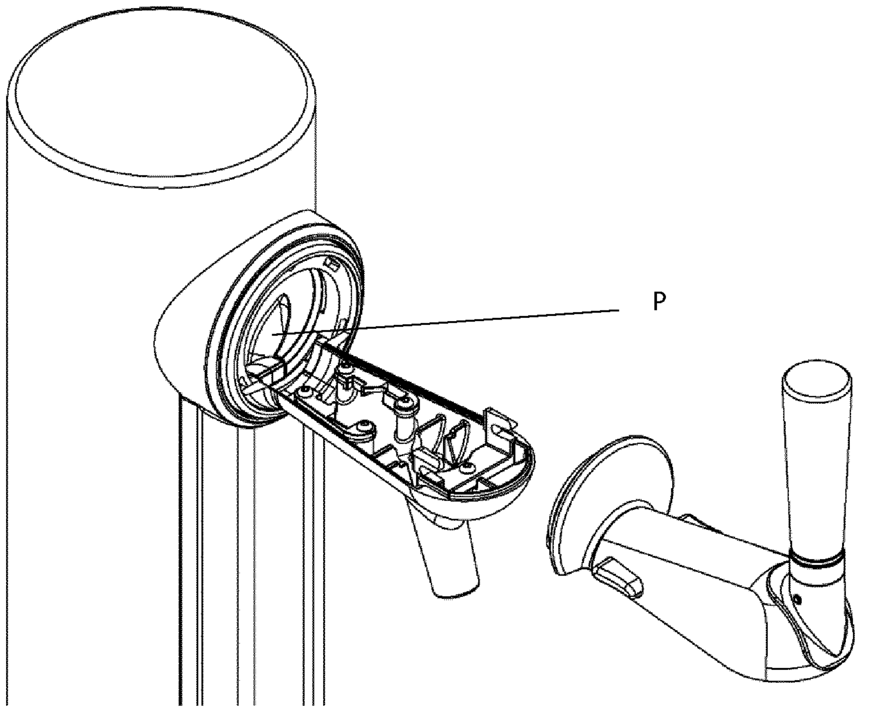
Figure 6A:
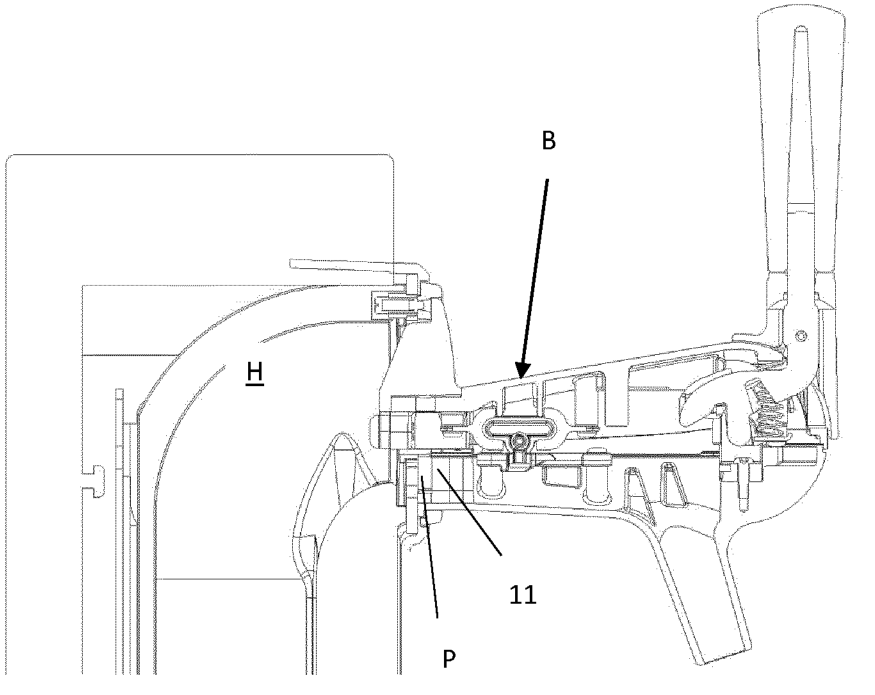
FIG. 6*a* is a vertical cross-sectional view of the tap unit.
Figure 6B:
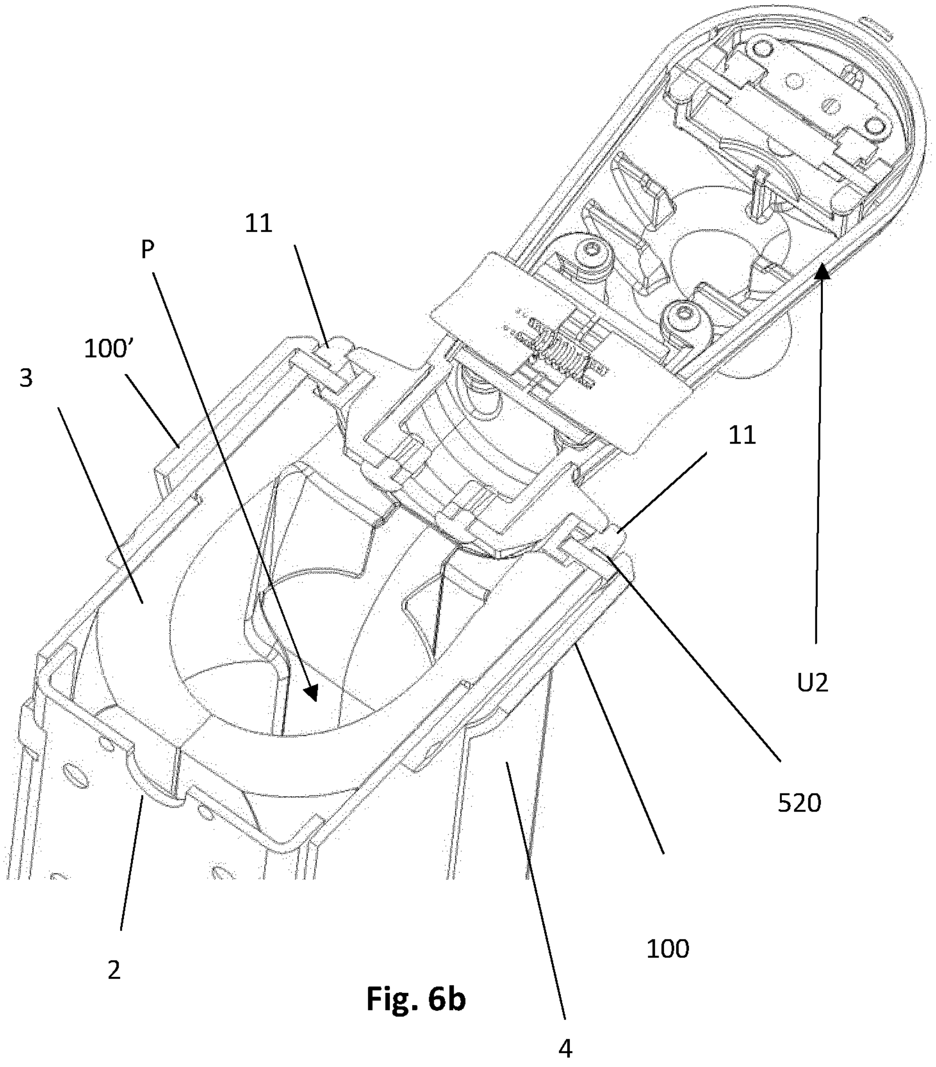
FIG. 6*b* is a top perspective cross-sectional view showing a lower component of the tap unit mounted to a metal post of the beverage dispensing system.

Connecting then the tap unit T to the connector flange 100 of the column C as shown in FIG. 5*d* leads to a positional fixing of at least some of the aforementioned components 2, 3, 4, 5 of the dispensing column C to each other in that the periphery of the ring-shaped connector flange 11 of the tap unit T is brought to bear against an annular face 520 of the enlarged top 500 of the further cladding 4, see also FIG. 6*b*. As long as the further, second cladding 4 is held against sideways movement by the connector flange 11 of the tap unit T, the second cladding 4 cannot be shifted into a position wherein the enlarged top 500 thereof is no longer matingly received by the widened portion A1 of the elongated aperture A of the first cladding component 5. Hence, in this configuration moving the first cladding 5 upwards, away from the post 2, is prevented.

As is well-known a user-visible component, as exemplified by the first cladding component 5 discussed above, of a beverage dispensing column C is often provided with information about the beverage available for pouring. The shown dispensing column C with tap unit T defines a beverage dispensing system BDS allowing for easy replacement of the information by replacing the first cladding component 5. This is conveniently be done by disconnecting the connector flange 11 of the tap unit T from the connector flange 100 of the column C, which allows for the first cladding component 5 to be pulled vertically upwards and replaced with another one, after a sideways shifting of the further second cladding 4 into a position wherein the enlarged top 500 thereof is no longer received by the widened portion A1 of the elongated aperture A of the elongated first cladding component 5.

Figure 3A:
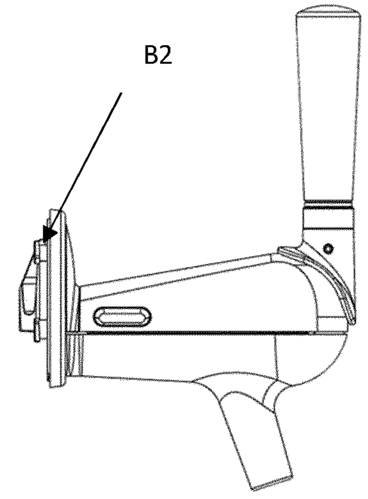
FIGS. 3*a*-3*c* are side and perspective views of a tap unit of the beverage dispensing system, and an end view thereof showing how the tap unit is manipulated for connection with a connector flange of a metal post of the beverage dispensing system.

For this and for other alternative purposes, such as to allow for cleaning of the tap unit T, according to the invention are the aforementioned two connector flanges 11, 100 releasably interconnectable, preferably by respective bayonet coupling parts B1, B2, shown in FIGS. 2*a* and 3*a*, respectively. Hence, with the invention the outer design/visual appearance of the beverage dispensing system BDS, as defined by the first cladding component 5, can be changed without removing the actual core thereof, namely the post 2 with the elongated heat insulating structure 3, from the bar.

When using bayonet coupling parts B1, B2 the tap unit T generally is mounted to the connector flange 100 of the column C in two steps, namely by first moving the two connector flanges into 11, 100 mutual engagement and then turning (see FIG. 3*c*) the tap unit T until the two connector flanges 11, 100 are locked together by bayonet action.

Figure 3B:
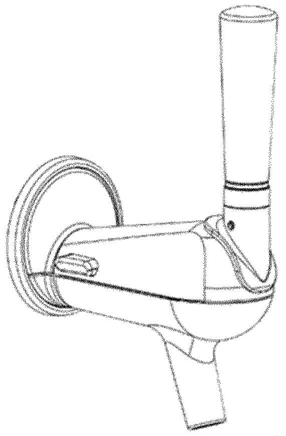
Figure 3C:
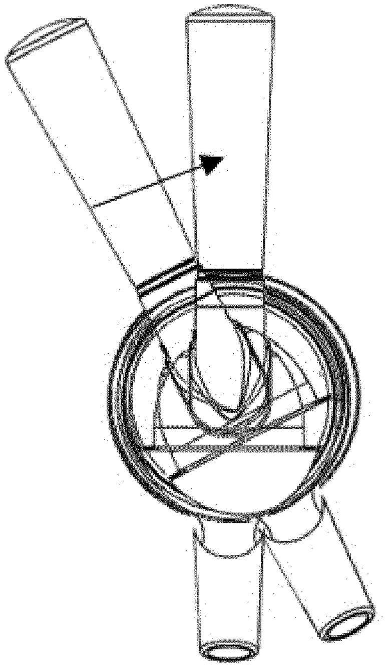

When turned to its final position as shown in FIG. 3*b*, the tap unit T may be positionally locked by a user-operable spring loaded pin (not shown) which is manually manipulated to allow for subsequent release of the bayonet coupling, at which point the tap unit T may be removed from the dispensing column C either for the purpose of cleaning the tap unit T or for replacing the first cladding component 5 carrying the aforementioned indicia 1000.

With a bayonet coupling no tools are needed for replacing/removing the tap unit T; optionally a tool may be used to activate the aforementioned spring loaded pin, which will allow for release of the tap unit T.

As shown in FIG. 6*a*, to remove the upper component U1 of the tap unit T a button B may be activated. Removal of the lower component U2 from the post 2 may be carried out with or without prior removal of the upper component U1.

To reiterate, when the post 2 is mounted on a bar top a user can finish the installation of the system BDS in a few steps. The first cladding component 5 is mounted around the post 2 and the tap unit T is connected to the post 2, securing both the second cladding component 4 and the first cladding component in place. The first cladding component 5 can be made in many shapes and sizes and may include illuminated panels and decoration.

Optionally, the first cladding component 5 may be connected to the post 2 when the first cladding component 5 is moved vertically down to receive the post 2, such as by a snap-engagement once the first cladding component 5 has been correctly positioned relative to the post 2.

The invention claimed is:

1. A beverage delivery system comprising:
a dispensing column;
a tap unit comprising a spout, wherein said tap unit is releasably connectable to said dispensing column, wherein said dispensing column comprises an elongated post and a first removable cladding component that is elongated, said first removable cladding component receiving said elongated post, wherein connecting said tap unit to said elongated post secures said first removable cladding component to said elongated post and wherein disconnecting and removing said tap unit from said elongated post allows removal of said first removable cladding component from said elongated post; and
said first removable cladding component having an opening on one side thereof, said beverage delivery system further comprising a second removable cladding component being matingly received in said opening and being held matingly received in said opening by said tap unit, wherein removal of said tap unit allows for removal of said second removable cladding component from said opening and then removal of said first removable elongated cladding component from said elongated post.

2. The beverage delivery system of claim 1, wherein said tap unit is releasably connectable to said dispensing column by a bayonet coupling.

3. The beverage delivery system of claim 2, said elongated post including a passage for a tubing for dispensing a beverage via said tap unit.

4. The beverage delivery system of claim 3, said elongated post comprising an insulating material structure defining said passage.

5. The beverage delivery system of claim 2, said elongated post comprising a first connector flange, said tap unit comprising a second connector flange, said first connector flange and said second connector flange being for said releasable connection of said tap unit to said dispensing column.

6. The beverage delivery system of claim 2, said opening defining an elongated portion and a widened portion, wherein an enlarged portion of said second removable cladding component being matingly received in said widened portion and being held matingly received in said widened portion by said tap unit, wherein removal of said tap unit allows for removal of said second removable cladding component from said widened portion.

7. The beverage delivery system of claim 2, wherein said second removable cladding component is elongated.

8. The beverage delivery system of claim 1, said elongated post including a passage for a tubing for dispensing a beverage via said tap unit.

9. The beverage delivery system of claim 8, said elongated post comprising an insulating material structure defining said passage.

10. The beverage delivery system of claim 1, said elongated post comprising a first connector flange, said tap unit comprising a second connector flange, said first connector flange and said second connector flange being for said releasable connection of said tap unit to said dispensing column.

11. The beverage delivery system of claim 1, said opening defining an elongated portion and a widened portion, wherein an enlarged portion of said second removable cladding component being matingly received in said widened portion and being held matingly received in said widened portion by said tap unit, wherein removal of said tap unit allows for removal of said second removable cladding component from said widened portion.

12. The beverage delivery system of claim 1, wherein said second removable cladding component is elongated.

13. A method for changing of information provided by a beverage dispensing system comprising:
a dispensing column; and
a tap unit comprising a spout, wherein said tap unit is releasably connectable to said dispensing column, wherein said dispensing column comprises an elongated post and a first removable cladding component that is elongated and provides first information, said first removable cladding component receiving said elongated post, wherein connecting said tap unit to said elongated post secures said first removable cladding component to said elongated post and wherein disconnecting and removing said tap unit from said elongated post allows removal of said first removable cladding component from said elongated post; and
said first removable cladding component having a first opening on one side thereof, said beverage delivery system further comprising a second removable cladding component being matingly received in said first opening and being held matingly received in said first opening by said tap unit, wherein removal of said tap unit allows for removal of said second removable cladding component from said first opening and then removal of said first removable cladding component from said elongated post;
wherein the method comprises:
providing a third removable cladding component having an opening on one side thereof, wherein said third removable cladding component providing second information different from said first information;
releasing said tap unit from said elongated post;
displacing said first removable cladding component along a length of said elongated post while fixed to a surface; and
positioning said third removable cladding component by displacing said third removable cladding component along said length of said elongated post fixed to said surface, until said elongated post is received within said third removable cladding component; and
connecting said tap unit to said elongated post to secure said third removable cladding component to said elongated post, wherein subsequent removal of said tap unit allows for removal of said second removable cladding component from said opening of said third removable cladding component and then removal of said third removable cladding component from said elongated post.

* * * * *